United States Patent [19]

Werres

[11] 4,280,875
[45] Jul. 28, 1981

[54] SAFETY DEVICE FOR PREVENTING UNSCREWING OF CYLINDER-HEAD SCREWS HAVING AN INNER POLYGON, AND PLASTIC DEFORMATION TOOL FOR USE WITH THE DEVICE

[75] Inventor: Lothar Werres, Langensendelbach, Fed. Rep. of Germany

[73] Assignee: Kraftwerk Union Aktiengesellschaft, Mülheim, Fed. Rep. of Germany

[21] Appl. No.: 951,273

[22] Filed: Oct. 13, 1978

[30] Foreign Application Priority Data

Oct. 26, 1977 [DE] Fed. Rep. of Germany ....... 2747994

[51] Int. Cl.$^3$ ............................................ G21C 13/06
[52] U.S. Cl. ...................................... 176/87; 411/122
[58] Field of Search ............................. 176/78, 37, 87; 151/2 A, 3

[56] References Cited

U.S. PATENT DOCUMENTS

| | | | |
|---|---|---|---|
| 1,341,279 | 5/1920 | Offner | 151/3 |
| 2,481,325 | 9/1949 | Miller | 151/41.7 X |
| 3,431,170 | 3/1969 | Lass et al. | 176/78 |
| 3,750,732 | 8/1973 | Moebius | 151/2 A |
| 3,775,249 | 11/1973 | Clapham | 176/78 |
| 3,878,042 | 4/1975 | Curulla et al. | 176/78 |
| 3,953,287 | 4/1976 | Long et al. | 176/78 |
| 3,971,575 | 7/1976 | Lesham et al. | 176/78 |
| 4,012,157 | 3/1977 | Krause et al. | 176/87 X |
| 4,063,831 | 12/1977 | Meuret | 176/87 |
| 4,077,840 | 3/1978 | Aubert | 176/87 |
| 4,100,021 | 7/1978 | Silverblatt | 176/87 |

FOREIGN PATENT DOCUMENTS

954580 10/1947 France .
1199636 4/1958 France .

Primary Examiner—Peter A. Nelson
Attorney, Agent, or Firm—Herbert L. Lerner

[57] ABSTRACT

Safety device for preventing unscrewing of cylinder head screws fastening two structural members together, one of the structural members having receiving bores formed therein, the screws having heads disposed in said receiving bores and being formed with inner polygonal cutouts, the screws extending through the one structural member and being anchored in the other structural member, includes circular grooves cut into the one structural member at the receiving bores, plastically deformable ring collars disposed in the circular grooves and spaced from the screw heads so as to form annular gaps therebetween, at least two arcuate recesses formed at equal distances from one another about the periphery of the screw heads, the ring collars having a first set of portions thereof pushable into the arcuate recesses in tightened condition of the screws.

10 Claims, 14 Drawing Figures

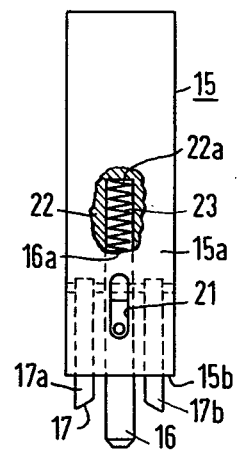
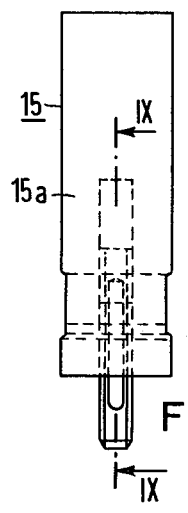
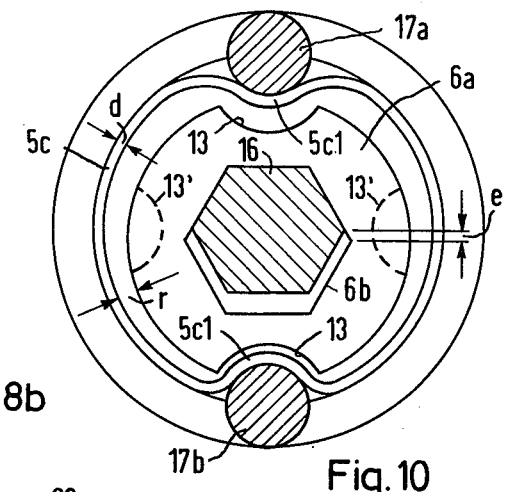
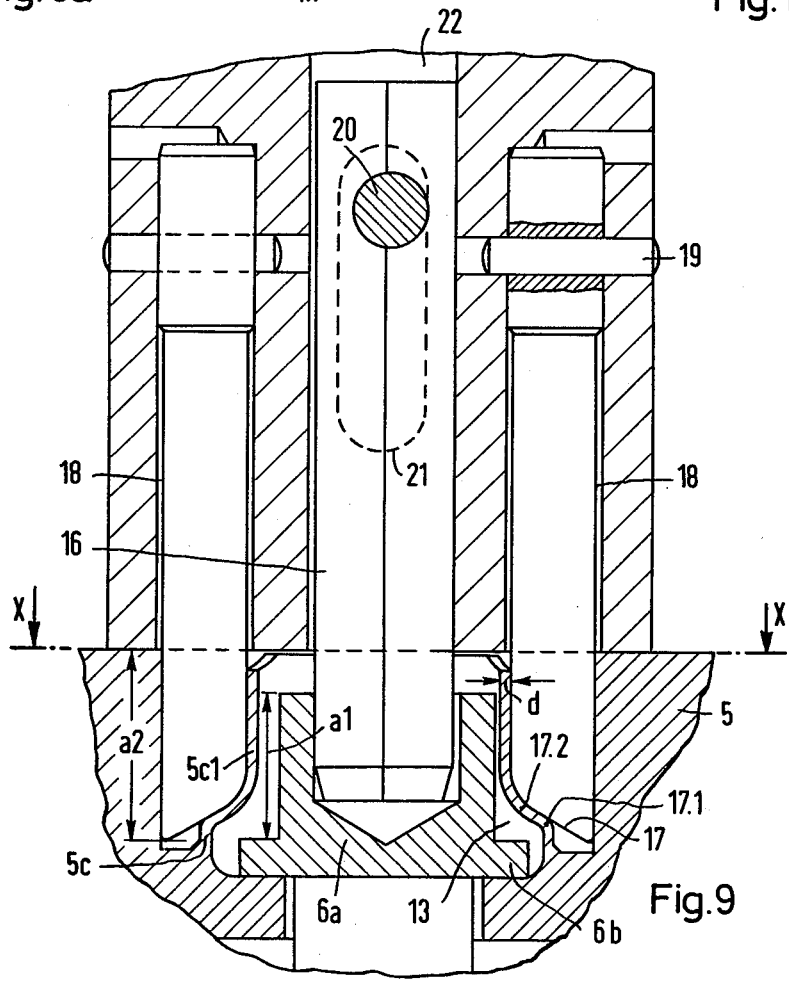

SAFETY DEVICE FOR PREVENTING UNSCREWING OF CYLINDER-HEAD SCREWS HAVING AN INNER POLYGON, AND PLASTIC DEFORMATION TOOL FOR USE WITH THE DEVICE

The invention relates to a safety device for preventing unscrewing of cylinder-head or pressure vessel cover screws having an inner polygon, which extends through a first structural part or member behind the latter and clamps it against a second structural part or member in which they are anchored, the screw heads being disposed in respective receiving holes of the first structural part, preferably for securing the internal parts of reactor pressure vessels.

Saftey devices against unscrewing cylinder-head screws with a polygonal recess, which include in particular those with a hexagonal recess, also called "Imbus screws", allen screws or socket head cap screws, must meet a number of requirements. Thus, the safety device must secure the screw aganst dropping out if the shank of the screw breaks. The unscrewing protection should be easy to establish after the screw is tightened but it must also be releasable if the structural parts which are clamped together by the rotation-secured screws are to be detached from each other again. The above-mentioned requirements are especially important in nuclear reactor engineering, and in this field for securing the internal parts of reactor pressure vessels. For changing fuel assemblies in pressurized- or boiling-water reactors, it is necessary to open the pressure vessel after the reactor is shut down. On this occasion, a number of inspections of parts of the reactor pressure vessel are performed, including the screw connections at internal parts of the pressure vessel. The above-mentioned requirements have not been satisfactorily met by the known devices.

It is therefore an object of the invention of the instant application to provide a device for preventing unscrewing which avoids the foregoing disadvantages of the heretofore known devices of this general type and, furthermore, that it not only meets the aforementioned requirements but, in addition, can be released without destruction and preferably in such a manner that it can be used at least a second time and, preferably, several times more.

With the foregoing and other objects in view, there is provided, in accordance with the invention, a safety device for preventing unscrewing of cylinder head screws fastening two structural members together, one of the structural members having receiving bores formed therein, the screws having heads disposed in the receiving bores and being formed with inner polygonal cutouts, the screws extending through the one structural member and being anchored in the other structural member, comprising circular grooves cut into the one structural member at the receiving bores, plastically deformable ring collars disposed in the circular grooves and spaced from the screw heads so as to form annular gaps therebetween, at least two arcuate or lemon-shaped recesses formed at equal distances from one another about the periphery of the screw heads, the ring collars having a first set of portions thereof pushable into the arcuate recesses in tightened condition of the screws.

The advantages that can be achieved with the invention are seen particularly in the fact that the device for preventing unscrewing can be released quickly and by means of a remotely controlled tool, which is especially important in applications to internal parts of reactor pressure vessels where such devices must be released quickly and without much radiation exposure for the operating personnel, after the reactor pressure vessel is opened. In this connection, in accordance with another feature of the invention, the first set of portions of the ring collars are reformable after being pushed into the arcuate recesses, the ring collars having a thickness, as compared to the shape of the arcuate recesses, whereby the loosening torque of the screws is at least equal to the tightening torque thereof.

In accordance with a further feature of the invention, there are provided additional sets of portions of the ring collars pushable into the arcuate recesses after reformation of the first set of portions, the screw heads having a plurality of pairs of arcuate recesses formed at different locations about the periphery thereof.

In accordance with an added feature of the invention, there are provided additional sets of portions of the ring collars pushable into the arcuate recesses after reformation of the first set of portions, each screw having a pair of arcuate recesses formed at different locations about the periphery of the screw head relative to a given reference point.

In accordance with an additional feature of the invention, the maximum width of the arcuate recesses, in radial direction of the screws, is substantially 2 to 4 times the thickness of the ring collars.

In accordance with yet another feature of the invention, the depth of the arcuate recesses is less than the thickness of the screw head in axial direction of the screw, and including stop flanges integral with the screw head below the arcuate recesses, in axial direction of the screw.

In accordance with yet an additional feature of the invention, the safety device is used for securing a core structure hold-down system of a nuclear reactor pressure vessel having a cover and an inner surface, wherein the one structural part is in the form of a ring flange holding an upper part of the core structure against a support flange disposed on the cover surface of the pressure vessel, and including pretensioned cup springs disposed between the hold-down plates and the ring flanges, a flange on the pressure vessel cover disposed above the hold-down plates, and t-shaped clamping studs partially extending through a hole formed in the hold-down plates for pushing the cup springs downward through the weight of the pressure vessel cover flange.

In this application, the invention also makes it possible to exchange the cup spring stacks after extended insertion quickly and without exposing the installation personnel to much radiation.

The subject of the invention is also a tool for the plastic deformation of the ring collar for the above-described device for preventing unscrewing. Therefore, in accordance with yet a further feature of the invention, there is provided a substantially cylindrical deforming punch having a lower surface of the deforming punch, the centering pin being centrally receivable in the inner polygonal cutouts of the screw heads, and two deforming plugs protruding from diametrically opposite locations of the lower surface of the deforming punch, the deforming plugs having deformation profiles for deforming the ring collar so as to correspond to desired impressions.

In accordance with still another feature of the invention, the deforming plugs are provided with downwardly and outwardly extending rounded edges.

In accordance with a concomitant feature of the invention, the centering pin is slidably received in a blind guide hole formed in the lower end of the deforming punch, and including a compression spring disposed between the closed end of the blind guide hole and an end of the centering pin, the centering pin having an elongated slot formed therein and a crosswise pin extending in radial direction of the centering pin through the elongated slot so as to prevent the centering pin from falling out of the deforming punch.

Other features which are considered as characteristic for the invention are set forth in the appended claims.

Although the invention is illustrated and described herein as embodied in safety device for preventing unscrewing of cylinder-head screws having an inner polygon, and plastic deformation tool for use with the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is a cross-sectional view taken along the line II—II in FIG. 3 in the direction of the arrows, at a point of the circumference different from that shown in FIG. 1a;

FIGS. 8a and 8b are, respectively, a front elevational view, partly in section, and a side elevational view of a tool for the plastic deformation of the ring collar;

FIG. 9 is a greatly enlarged cross-sectional view taken along the line IX—IX in FIG. 8b in the direction of the arrows; and FIG. 10 is a cross-sectional view taken along the line X—X in FIG. 9 in the direction of the arrow, FIGS. 9 and 10 showing the tool in the pushed-in condition i.e. during a deformation process.

Figures 1, 1A:
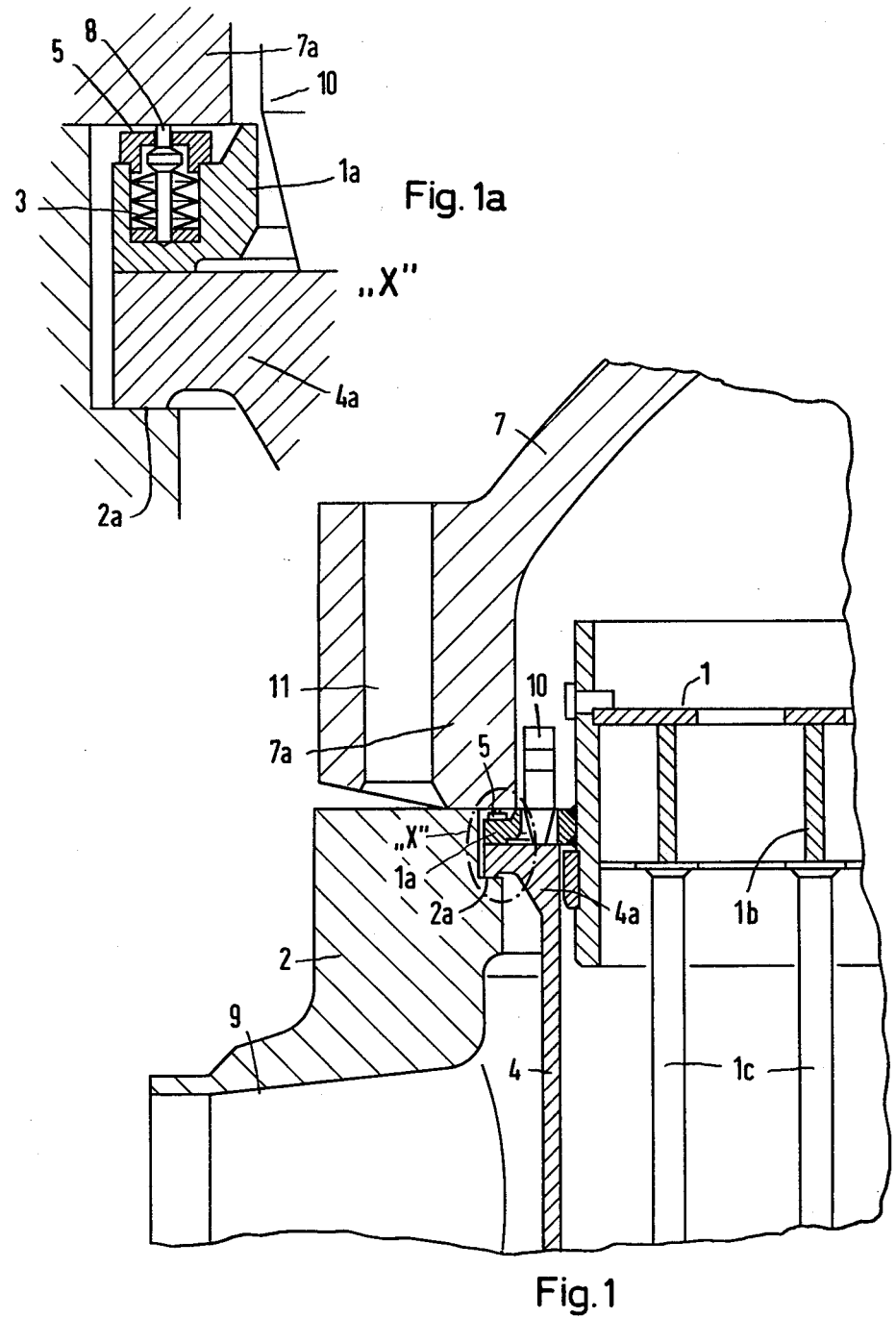
FIG. 1 is a diagrammatic cross-sectional view of the core structure mounting of a nuclear reactor pressure vessel, which is the preferred application for the device against unscrewing.
FIG. 1a is a greatly enlarged diagrammatic view of the area inside the dot-dash line X of FIG. 1.
Figure 2:
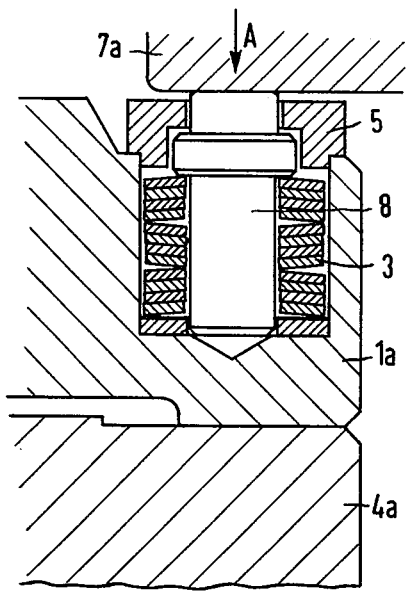

Referring now to the figures of the drawing and first, particularly, to FIGS. 1 and 1a thereof, there is shown an upper core structure 1 of a reactor pressure vessel 2, held by a ring flange 1a against a support flange 4a placed on the pressure vessel 2 at the inner circumference thereof, and more specifically, a shoulder 2a of the core barrel 4, with the interposition of pre-tensioning cup springs 3 constructed in the form of a column or a stack. Hold-down plates 5 (see also FIGS. 2 to 5) are fastened for holding down the cup springs 3, as a first structural part or member, to the ring flange 1a of the upper core structure 1 by means of screws 6, which are secured against rotation. The ring flange 1a and core structure 1 form a second structural part or member. The ultimate clamping of the core structure 4 is accomplished, as shown in FIGS. 1, 1a and 2, by the flange 7a of the pressure vessel cover or head 7, which extends over the hold-down plates 5 and through which clamping studs 8 projecting beyond the hold-down plates 5 of the cup springs 3 (see FIG. 4) can be pushed inward (downward in the drawing) for supplying the rest tension for the cup springs 3. In other words, according to FIG. 4, the cup spring column 3 is already pre-tensioned when the hold-down plate 5 is screwed down and secured against unscrewing and has thereby transmitted the pre-tension to the spring column 3 through the clamping stud 8. Starting from the pre-tensioned condition shown in FIG. 4, the clamping stud 8 is pushed inward additionally by the spring travel distance f for the ultimate clamping; this condition can be seen in FIG. 2. This ensures a particularly vibration-proof fastening of the upper core structue 1. The thermal expansion of the upper core structure 1 and the flange 4a of the core barrel 4 (which consist of austenitic material) relative to the pressure vessel 2 and its head 7 (of ferritic material with austenitic cladding on the inside) is assured. During the fuel assembly change mentioned above, the cup springs 3 can now be exposed, with the reactor pressure vessel open, and examined for proper functioning. It is important in this regard to unscrew the hold-down plates 5 by remote control from the top, and as quickly as possible. On the other hand, the screws 6 must be secure against rotation since loosening of the seating of the hold-down plates 5 must not happen under any circumstances. These requirements are met by the device against unscrewing according to the invention in a particularly advantageous manner. Before further explanation hereinafter, one of the reactor coolant nozzles 9 of the pressure vessel should be pointed out. The pressure vessel in question is for a pressurized-water nuclear reactor power plant with an electric power output of, say, 900 MW. The head screws of the core structure 1 are not shown in FIG. 1 for the sake of simplification, only the upper grid 1b with supports 1c can be seen. A so-called poller or trunnion 10 i.e. an eye- or hook-shaped element for hanging the core structure to the lifting traverse of a building crane and one of the head screw bore holes 11 in the head flange 7a are shown.

Figure 4:
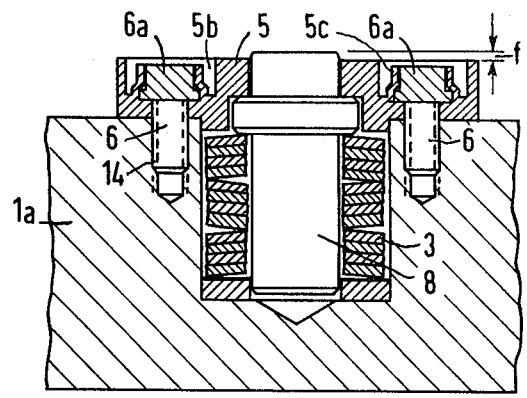
FIG. 4 is a cross-sectional view taken along the line IV—IV in FIG. 3 in the direction of the arrows.
Figure 6:
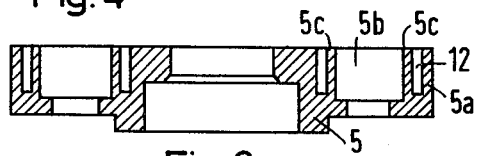
FIG. 6 is a cross-sectional view taken along the line VI—VI in FIG. 5 in the direction of the arrows.
Figure 5:
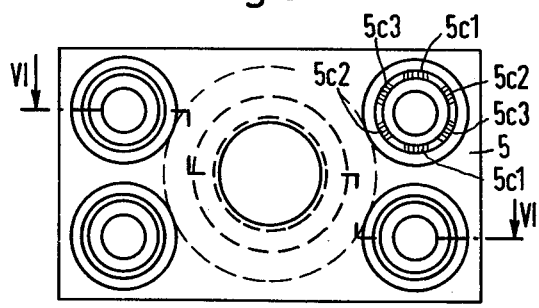
FIG. 5 is a top plan view of an individual hold-down plate in the not yet deformed condition of the ring collars.

As shown especially in FIGS. 5 and 6, a circular groove or slot 12 is cut into the wall 5a of the receiving hole 5b of the hold-down plate 5 (first structural part or member). This slot 12 is formed in such a manner that the head 6a of the screws 6, shown in FIG. 7, if disposed within this receiving hole 5b with the screw 6 in the tightened condition, is surrounded by a plastically deformable ring collar 5c with an annular gap r. This can be seen particularly clearly in FIGS. 9 and 10. The screw head 6a is provided with arcuate or citriform recesses 13, similar to the shape of the small end of a lemon, at two diametrically opposite points of its outer circumference. If the screws 6 are in the tightened condition (see particularly FIGS. 3, 4 and 9, 10), the wall portions 5c1 of the ring collar 5c, which are situated in the vicinity of the circumferential angle of the recesses 13, can now be pushed into the recesses 13.

Figure 3:
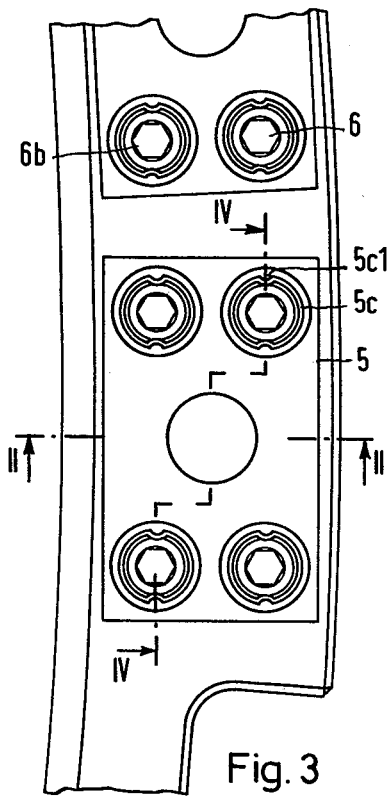
FIG. 3 is a top plan view taken in the direction of the arrow A in FIG. 2, wherein a portion of the circumference of the flange is shown and hold-down plates with rotation-proof screws can be seen.

FIGS. 3 and 4 show an overall view of the screw 6 in tightened and rotation-secured condition. It can be seen that each screw 6 has an inner hexagon 6b, extends through the hold-down plate 5 as the first structural part or member, engages behind the latter and clamps it against the ring flange 1a of the upper core structure 1 as the second structural part. In the ring flange, corresponding blind tapped holes 14, which are provided with internal threads are formed. The receiving holes 5b of the holddown plate 5 surround the screw head 6a over its entire axial length.

Figures 7A, 7C:
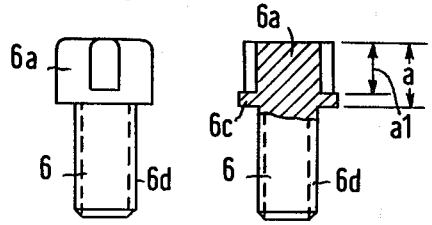
FIGS. 7a to 7c are three different views of the cylinder-head screw, FIG. 7a being a front elevational view, FIG. 7b a top plan view and FIG. 7c a side elevational view, partly in section.
Figure 7B:
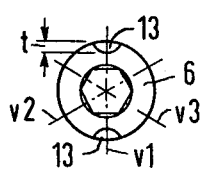

The enlarged view of FIG. 10 shows an inner hexagon 6b. However, this element may generally take the form of most any inner polygon, i.e., in principle, a square, an octogon or the like could be used. The important thing being that corresponding cap screw wrenches, for tightening and unscrewing the screws 6 preferably operated by remote control, can be inserted into this polygonal blind hole in the screw head 6a. The wall thickness d (see FIGS. 9 and 10) of the ring collar 5c and the shape of the recesses 13 are chosen so that the loosening torque of the screws 6 is not, or for the most part not, greater than their tightening torque, and the ring collars 13 can be used again for further rotation-securing deformations after the wall portions 5c1 pushed into the recesses 13 have been formed back to their original shape. An advantageous value for the wall thickness d for so called M10 socket head or allen cap screws is, for instance, 0.6 mm. This applies when an austenitic, ductile steel is used for the holddown plates, such as is required for a core structure holddown system. The arcuate or lemon-shaped of the recesses 13 shown is particularly advantageous for pushing-in the wall portions 5c1 during the plastic deformation as well as for pushing them out for unscrewing the screws 6. It has been found that wall portions 5c1 which have been pushed into the recesses 13 could be deformed plastically again to assume the rotation-prevention function. For repeated usability of the holddown plates 5 and their ring collars 5c, however, it is particularly advantageous if wall portions of the ring collars 5c which has not yet been deformed in a previous deformation process can be used for the further deformations. To illustrate this, three different sets of wall region pairs 5c1, 5c2 and 5c3 which are rotated relative to each other by 120° are illustrated in FIG. 5 by different shadings. In order to use the above-mentioned three different pairs of wall portions sucessively for each rotation-securing operation, the heads 6a of the screws 6 can be provided with several, selectable pairs of recesses which are disposed at different points of the circumference. For instance, the pair of recesses 13', 13' shown in FIG. 10 could be provided. This pair is shifted 90° relative to the pair of recesses 13, 13. Alternatively, three pairs of recesses according to the wall portion construction of FIG. 5 can be provided. However, it is also possible to use groups of screws with only one pair of recesses 13, 13 as can be seen from FIGS. 3 and 7. In this case, however, the connecting lines v1, v2, v3 of the recess 13, 13 are rotated from group to group by a predetermined circumferential angle, for instance, 120° or 60°, relative to a screw reference point. An advantageous value for the maximum depth of the arcuate or lemon-shaped recesses 13 is two to four ring collar wall thicknesses. This depth is designated t in FIG. 7b. As is illustrated in FIGS. 7c and 9, the arcuate or lemon-shaped recesses 13 cover only a part a1 of the axial length a of the screw head 6, so that an unweakened stop flange 6c of the screw head 6a is left (see also FIG. 7c). The thread of the screws 6 is designated 6d.

Referring now to the previously partly explained FIGS. 9 and 10, as well as to FIGS. 8a and 8b, the tool 15 for the plastic deformation of the ring collar 5c1 will now be explained. This tool 15 comprises a substantially cylindrical deforming punch 15a (FIGS. 8a and 8b) which can be inserted into the inner polygonal opening 6b of the respective screw 6 in the direction of the screw axis, in centering relationship. For this purpose a centering pin 16 which protrudes centrally beyond its bottom surface 15b and is spring-loaded axially movably and in a restoring manner is provided. The deforming punch 15a further has two diametrially opposed deforming plugs 17a and 17b with a deformation profile 17 corresponding to the impressions 5c1 to be made. To this end, the deforming edges of the deformation profile 17 of the deforming plugs 17a, 17b are provided with rounded deforming edges 17.1, 17.2 which extend at an angle downward and outward as is clearly shown, especially in FIG. 9. The deforming plugs 17a, 17b themselves each are round pins having inclined surfaces 17.1, with which they engage the upper edge of the not yet deformed ring collar 5c and then curve the ring collars 5c inward with their rounded edges 17.2 upon further lowering of the deforming punch, so that a shape with the impressions 5c1 shown in FIGS. 9 and 10 is obtained. The deforming plugs 17a, 17b are inserted into corresponding axial holes 18 of the tool 15 and are pinned there by means of dowel pins 19. The centering pin 16 has an elongated hole 2 formed therein and is provided with a crosswise pin 20 guided in the elongated hole 21 so as to secure the centering pin 16 against dropping out of the punch 15a. Between the end 22a of the blind guide hole 22 (see FIG. 8a) and the inner end 16a of the centering pin 16, a compression coil spring 23 is inserted. The deforming plugs 17a, 17b protrude from the punch 15a by a distance a2 such that when the bottom surface 15b of the punch 15a is placed on the structural part 5, the precise desired deformation length of the wall regions 5c1 is obtained. In the deformation process, the punch 15a with the pin 16 is axially guided at the walls of the inner polygon 6b. As illustrated in FIG. 10, a slight lateral offset e can be permitted without interfering with the protection against unscrewing. The punch 15a can be fastened at the lower end to a suitable holder, not shown. The offset e shown is exaggerated and can result from the fact that the inner hexagon 6b is slightly wider than the outside dimension of the plug 6 for the purpose of easier insertion.

There are claimed:

1. Safety device for preventing unscrewing of cylinder head screws fastening two structural members together, one of the structural members having receiving bores formed therein, the screws having heads disposed in said receiving bores and being formed with inner polygonal cutouts, the screws extending through and braced behind the one structural member and being tensioned against and anchored in the other structural member, comprising circular grooves cut into the one structural member at the receiving bores forming plastically deformable ring collars of said one structural member disposed adjacent to the circular grooves and spaced from and surrounding the screw heads so as to form annular gaps therebetween, at least two arcuate recesses formed at equal distances from one another about the periphery of the screw heads, said ring collars having a first set of rotation-preventing wall portions thereof surrounding the screw heads and being pushable into the arcuate recesses in tightened condition of the screws.

2. Safety device according to claim 1, wherein said first set of wall portions of said ring collars are reformable and repeatedly reusable for rotation-preventing deformations after being pushed into the arcuate recesses, said walls of said ring collars having a thickness, as compared to the shape of the arcuate recesses, whereby the loosening torque of the screw is at least equal to the tightening torque thereof.

3. Safety device according to claim 2, including additional sets of previously undeformed portions of said walls of said ring collars pushable into the arcuate recesses after reformation of said first set of wall portions, the screw heads having a plurality of pairs of arcuate recesses formed at different locations about the periphery thereof in alignment with said ring collar wall portions.

4. Safety device according to claim 2, including additional sets of screws each having at least one pair of arcuate recesses formed at different predetermined locations about the periphery of the screw head relative to the placement of said first-mentioned arcuate recesses, for further deformations.

5. Safety device according to claim 1, wherein the maximum width of the arcuate recesses, in radial direction of the screws, is substantially 2 to 4 times the thickness of the ring collars.

6. Safety device according to claim 1, wherein the depth of the arcuate recess is less than the tickness of the screw head, in axial direction of the screw forming unweakened stop flanges integral with the screw head below the arcuate recesses, in axial direction of the screws.

7. Safety device according to claim 1, wherein the safety device is used for securing a core structure hold-down system of a nuclear reactor pressure vessel having a cover and an inner surface, wherein the one structural part is in the form of a hold-down plate, the other structural member is in the form of a ring flange holding an upper part of the core structure against a support flange disposed on the inner surface of the pressure vessel, and said rotation-preventing screws hold said plate and ring flange together, and including pretensioned cup springs disposed between said hold-down plates and said ring flanges, a flange on the pressure vessel cover disposed above said hold-down plates for finally securing said upper core structure, and t-shaped clamping studs partially extending above the hold-down plates through a hole formed therein for pushing the cup springs downward through the weight of said pressure vessel cover flange.

8. Safety device according to claim 1, including a substantially cylindrical deforming punch having a lower surface, a springloaded axially retractable centering pin protruding from the lower surface of the deforming punch, said centering pin being centrally receivable in the inner polygonal cutouts of the screw heads, and two deforming plugs protruding from diametrically opposite locations of the lower surface of the deforming punch, said deforming plugs having deformation profiles for deforming said ring collars.

9. Safety device according to claim 8, wherein said deforming plugs are provided with downwardly and outwardly extending rounded edges.

10. Safety device according to claim 8, wherein said centering pin is slideably received in a blind guide hole formed in the lower end of said deforming punch, and including a compression spring disposed between the closed end of the blind guide hole and an end of said centering pin, said centering pin having an elongated slot formed therein and a crosswise pin extending in radial direction of said centering pin through the elongated slot so as to prevent said centering pin from falling out of said deforming punch.

* * * * *